(12) United States Patent
Ramaraju et al.

(10) Patent No.: US 7,984,229 B2
(45) Date of Patent: Jul. 19, 2011

(54) PIPELINED TAG AND INFORMATION ARRAY ACCESS WITH SPECULATIVE RETRIEVAL OF TAG THAT CORRESPONDS TO INFORMATION ACCESS

(75) Inventors: Ravindraraj Ramaraju, Round Rock, TX (US); Ambica Ashok, Austin, TX (US); David R. Bearden, Austin, TX (US); Prashant U. Kenkare, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 860 days.

(21) Appl. No.: 11/684,529

(22) Filed: Mar. 9, 2007

(65) Prior Publication Data

US 2008/0222361 A1 Sep. 11, 2008

(51) Int. Cl.
 G06F 12/00 (2006.01)
(52) U.S. Cl. ............... 711/3; 711/128; 711/E12.059
(58) Field of Classification Search ............... 711/3
 See application file for complete search history.

(56) References Cited

U.S. PATENT DOCUMENTS

| | | | |
|---|---|---|---|
| 5,335,333 A * | 8/1994 | Hinton et al. | 711/207 |
| 5,754,819 A | 5/1998 | Lynch et al. | |
| 5,860,151 A * | 1/1999 | Austin et al. | 711/213 |
| 6,412,051 B1 * | 6/2002 | Konigsburg et al. | 711/163 |
| 6,477,635 B1 * | 11/2002 | Kahle et al. | 711/210 |
| 7,644,198 B2 * | 1/2010 | King et al. | 710/22 |
| 2003/0196038 A1 * | 10/2003 | Sumita | 711/119 |
| 2006/0047883 A1 * | 3/2006 | O'Connor et al. | 711/3 |
| 2007/0028051 A1 * | 2/2007 | Williamson et al. | 711/128 |

OTHER PUBLICATIONS

IEEE 100 The Authoritative Dictionary of IEEE Standards Terms Seventh Edition. Electric and Electronic Engineers, Inc. Date 2000 Page No. (352).*
U.S. Appl. No. 11/257,932, filed Oct. 25, 2005, by David Bearden, George P. Hoekstra, Ravindraraj Ramaraju.
U.S. Appl. No. 11/459,170, filed Jul. 21, 2006, by Prashant Kenkare, Ravindraraj Ramaraju, and Ambica Ashok.
U.S. Appl. No. 11/552,817, filed Oct. 25, 2006, by Prashant Kenkare, Ravindraraj Ramaraju, and Ambica Ashok.
Cortadella, J. et al., "Evaluation of A + B = K Conditions Without Carry Propagation", IEEE Transactions on Computers, vol. 41, No. 11, Nov. 1992, pp. 1484-1488.
Lee, Yung-Hei et al., "Address Addition and Decoding without Carry Propagation", IEICE Trans. Inf. & Syst., vol. E80-D, No. 1, Jan. 1997, pp. 98-100.
Nicolaescu, D., et al. "Fast Speculative Address Generation and Way Caching for Reducing L1 Data Cache Energy", © 2006 IEEE, 7 pages.

* cited by examiner

Primary Examiner — Reginald G Bragdon
Assistant Examiner — Hamdy S Ahmed
(74) Attorney, Agent, or Firm — Zagorin O'Brien Graham LLP

(57) ABSTRACT

A cache design is described in which corresponding accesses to tag and information arrays are phased in time, and in which tags are retrieved (typically speculatively) from a tag array without benefit of an effective address calculation subsequently used for a corresponding retrieval from an information array. In some exploitations, such a design may allow cycle times (and throughput) of a memory subsystem to more closely match demands of some processor and computation system architectures. Our techniques seek to allow early (indeed speculative) retrieval from the tag array without delays that would otherwise be associated with calculation of an effective address eventually employed for a corresponding retrieval from the information array. Speculation can be resolved using the eventually calculated effective address or using separate functionality. In some embodiments, we use calculated effective addresses for way selection based on tags retrieved from the tag array.

23 Claims, 5 Drawing Sheets

US 7,984,229 B2

PIPELINED TAG AND INFORMATION ARRAY ACCESS WITH SPECULATIVE RETRIEVAL OF TAG THAT CORRESPONDS TO INFORMATION ACCESS

BACKGROUND

1. Field

This disclosure relates generally to memory hierarchies, and more specifically, to pipelining of tag lookups and information accesses in a cache.

2. Related Art

Accesses by a processor to addressable memory typically include calculation of an effective address, often by a memory management unit (MMU). Base/offset arithmetic is widely employed in effective address calculations and adders or similar circuits are often used. Caching techniques are also widely employed in the art to reduce effective latency for retrieval of information from memory. By providing a comparatively small and fast cache memory and managing its contents, it is possible to satisfy many memory accesses from cache memory, thereby avoiding comparatively long-latency accesses to main memory. Generally, tags (often a portion of an effective address) are employed to identify in the cache a data entry that corresponds to the desired memory access.

While caching and/or buffering techniques tend to improve the overall performance of a memory subsystem, latencies in a tag lookup and data retrieval can themselves limit performance of processor. Accordingly, improved techniques are desired.

BRIEF DESCRIPTION OF THE DRAWINGS

The present invention is illustrated by way of example and is not limited by the accompanying drawings, in which like references indicate similar elements. Elements in the drawings are illustrated for simplicity and clarity and have not necessarily been drawn to scale.

DETAILED DESCRIPTION

Figure 1:
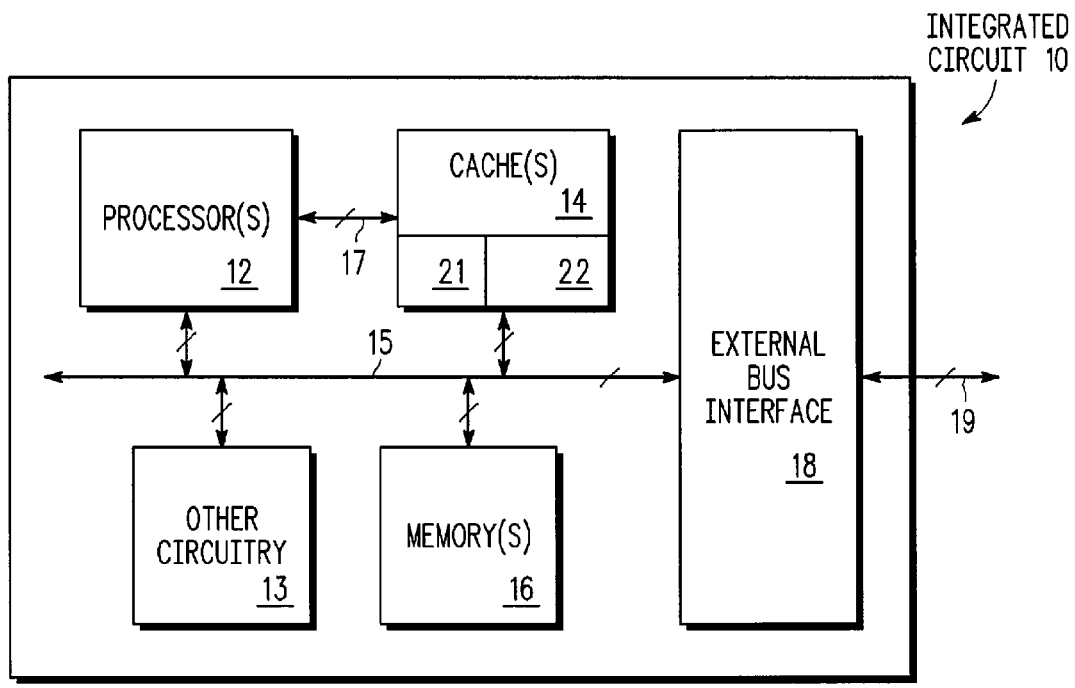
FIG. 1 shows a diagram of an exemplary integrated circuit, consistent with some embodiments of the present invention.

It has been discovered that a cache design in which corresponding accesses to tag and information arrays are phased in time, and in which tags are retrieved (typically speculatively) from a tag array without benefit of an effective address calculation subsequently used for a corresponding retrieval from an information array, may allow cycle times (and throughput) of a memory subsystem to more closely match demands of some processor and computation system architectures. In some cases, phased access can be described as pipelined tag and information array access, though strictly speaking, indexing into the information array need not depend on results of the tag array access. Rather, our techniques seek to allow early (indeed speculative) retrieval from the tag array without delays that would otherwise be associated with calculation of an effective address eventually employed for a corresponding retrieval from the information array. Speculation can be resolved using the eventually calculated effective address or using separate functionality, if desired. In some embodiments, we use calculated effective addresses for way selection based on tags retrieved from the tag array. In some variations (particularly those that employ other cache association or mapping strategies), an eventually calculated effective address may be employed to evaluate whether a retrieved tag constitutes a hit.

As general matter, this disclosure sets forth a detailed description of one or more modes for carrying out the present invention. The description is intended to be illustrative and should not be taken to be limiting. Indeed, while certain embodiments consistent with the present invention are illustrated in the context of, and/or using examples consistent with, a memory management unit that includes a 4-way set-associative translation lookaside buffer (TLB) implementation, persons of ordinary skill in the art will appreciate additional embodiments based on the description herein. For example, much or our description is applicable to a 4-way set-associative first-level (L1) data cache. Indeed, persons of ordinary skill in the art will appreciate variations in which techniques of the present invention are exploited at different and/or additional levels of a storage hierarchy, in the caching (or buffering) of other types of information, and/or in the context of a design that employs different associations or mappings. Furthermore, persons of ordinary skill in the art will appreciate embodiments in which the particular information cached or buffered using our techniques includes (i) address translations, (ii) data, (iii) instructions, (iv) data and instructions or any other addressable/indexable information employed in a particular implementation. In the description and claims that follow, we use the term cache broadly to encompass structures including virtual-to-physical address translation caches (also known as translation lookaside buffers) and other content addressable memories. These and other related variations and alternative embodiments are all envisioned and will be understood based on the present description.

Similarly, some of our techniques are not limited to use in caches that implement the particular association or mapping strategies detailed herein. Rather, our use of a separately (and in some cases speculatively) accessed tag array is applicable to a variety of cache designs, be they associative, set-associative, direct-mapped, etc. Further, generally speaking, storage hierarchies may include multiple levels of cache and circuits that facilitate virtual memory, including translation lookaside buffers (TLBs), as well as store buffers. Based the description herein, persons of ordinary skill in the art will appreciate exploitations of some of our techniques in blocks and circuits that have different names or include additional (or alternate) functionality. Finally, consistent with big-endian conventions typical of microprocessor implementations that conform to the PowerPC® instruction set architecture (including those available from Freescale Semiconductor, Inc.), descriptions and/or illustrations that detail bit ordering of memory addresses use a format in which a most-significant-bit (MSB) is styled as a $0^{th}$ bit while a least-significant-bit (LSB) is styled at an $N^{th}$ bit. Use of big-endian conventions in our illustration and explanation of any specific implementation should in no way be interpreted as a requirement for other implementations. Indeed, based on the present description, persons of ordinary skill in the art will appreciate suitable variations for other bit and/or byte ordering conventions. Whenever possible, we use terminology such as "carry-in," "lower-order" and "higher-order" in a neutral way that is independent of any particular bit- or byte-ordering. PowerPC is a trademark of IBM Corporation.

Therefore, in view of the above, and without limitation, we now describe certain illustrative embodiments consistent with the present invention.
Systems and Integrated Circuit Realizations, Generally FIG. 1 shows an information processing configuration that includes processor(s) 12, cache(s) 14, memory(s) 16, an external bus interface 18 and other circuitry 13. In the illustrated configuration, the aforementioned components are together embodied as exemplary integrated circuit 10; however, in other embodiments one or more components may be implemented in separate integrated circuits. Internal components of illustrated integrated circuit 10 are interconnected and interoperate using any suitable techniques. For simplicity, we illustrate interconnection amongst major functional blocks via bus 15, although persons of ordinary skill in the art will recognize that any of a variety of interconnection techniques and topologies may be employed without departing from the present invention. In general, integrated circuit 10 may interface to external components via external bus 19 or using other suitable interfaces.

In general, cache(s) 14 may be of any type in which (or in conjunction with) pipelined tag and information array accesses are performed at some level in a memory hierarchy. In particular, cache(s) 14 may include translation lookaside buffer (TLB) and/or L1 cache exploitations of the techniques now described. Typically, implementations of cache(s) 14 support speculative retrieval of tag information from a tag array 21 and subsequent retrieval of corresponding information from information array 22 as described elsewhere herein. For purposes of illustration, tag array 21 and information array 22 are shown as portions of cache(s) 14, although similar features may appear in other in elements or circuits of a memory hierarchy, including memory(s) 16. Similarly, cache(s) 14 and/or other components of similar design may appear as part of a memory management unit, e.g. as part of a TLB implementation. Although FIG. 1 shows separate memory(s) 16 and cache(s) 14, other realizations consistent with the present invention may include one, but not the other, or may combine two or more levels of a memory hierarchy into one element or block.

Types, numbers or arrangements of components shown within integrated circuit 10 are merely illustrative and persons of ordinary skill will appreciate that systems and/or integrated circuit embodiments consistent with the present invention may, more generally, include other types, numbers, and arrangements of components. Processor(s) 12 may include a microprocessor, microcontroller, digital signal processor or other similar device, and may include multiple cores, if desired. Similarly, although examples that follow largely presume a conventional RISC-style processor architecture with 64-bit memory addresses and operands together with conventional address arithmetic, other processor architectures and memory addressing conventions are also possible and suitable variations will be understood based on the present description.

Figure 2:
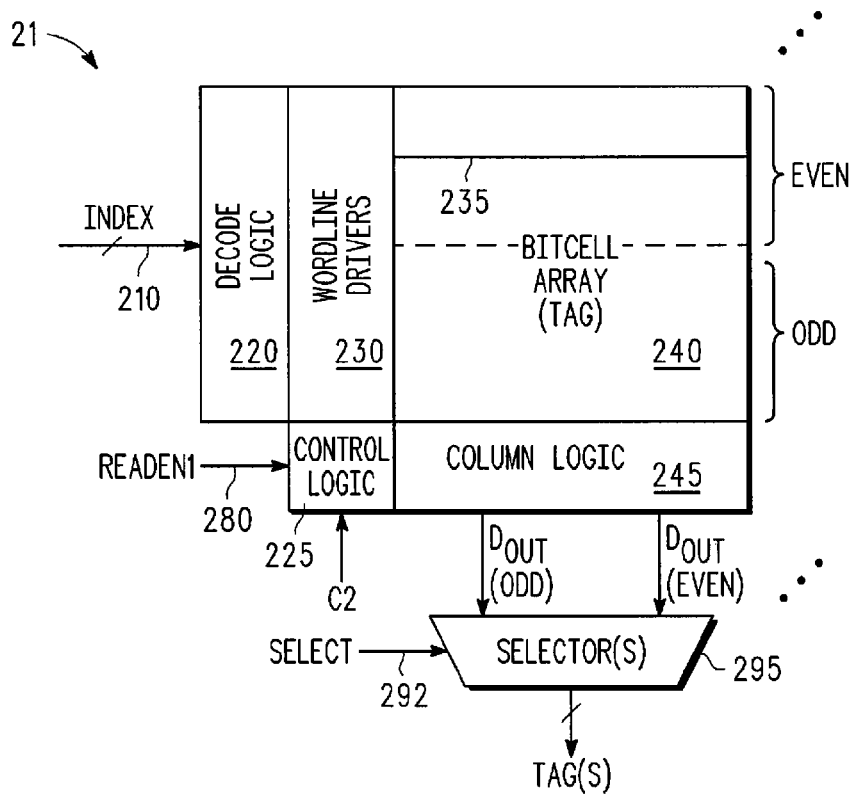
FIGS. 2 and 3 depict organization of respective tag and information arrays for a memory or cache configuration consistent with some embodiments of the present invention.
Figure 3:
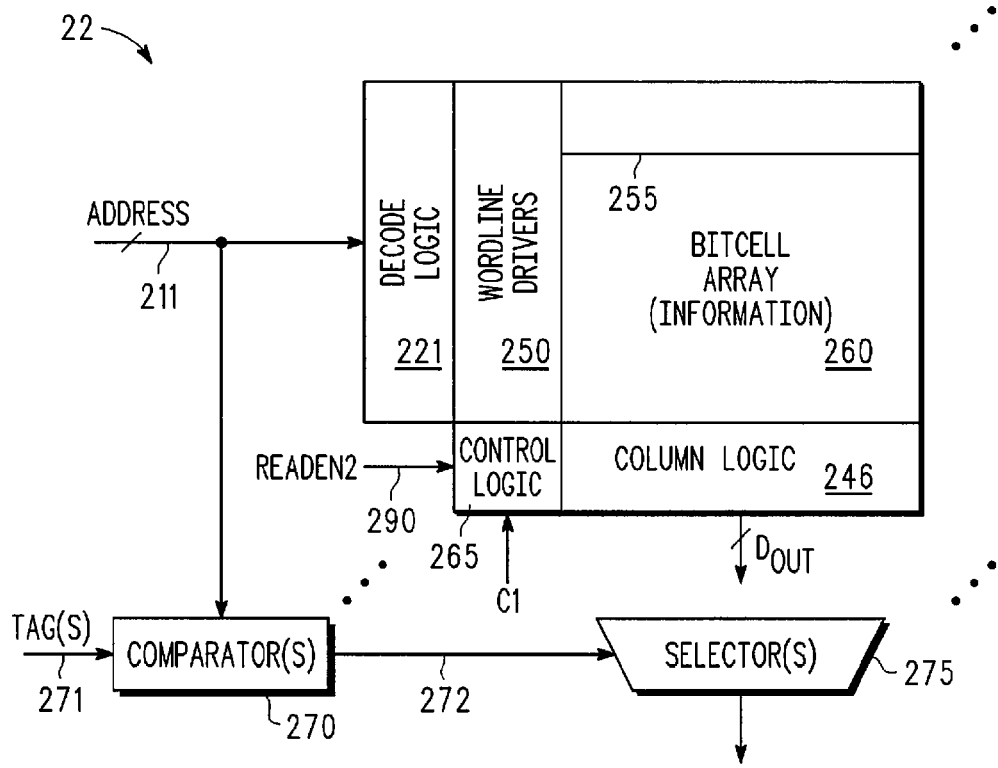

FIGS. 2 and 3 depict organization of respective tag and information arrays for a storage configuration consistent with some embodiments of the present invention. In particular, tag array 21 (see FIG. 2) includes a bitcell array 240, decode logic 220, word line drivers 230, control logic 225 and column logic 245. Persons of ordinary skill in the art will recognize these features as typical components of memory array design and will appreciate a wide range of implementations and circuits consistent therewith. Timings for signals such as read enable (READEN1) 280 and clock C2 may be adapted to the particular implementation and circuits employed, but are otherwise conventional.

Tag array 21 receives memory addressing information suitable to select and drive corresponding word lines of bitcell array 240. In the illustrated configuration, decode logic 220 receives index 210 information and activates a corresponding circuit of word line drivers 230, which in turn allows addressed tag information to be read out of bitcell array 240 using column logic 245. Index 210 encodes addressing information corresponding to a subset of all addressing bits employed in the memory architecture. For example, in some embodiments described in greater detail below, 4 bit positions (e.g., bits 48:51) corresponding to a 64-bit (0:63) memory address are used to index into bitcell array 240. In the illustrated embodiment, bitcell array 240 is partitioned into odd and even row portions, although other embodiments may partition the array in another way, including e.g., into column portions, and/or (as explained later) into way portions.

In many instruction set architectures, memory addressing involves address arithmetic such as base+offset addition. For simplicity, we illustrate an index 210, which in some embodiments consistent with the present invention may be encoded as an arithmetic sum of corresponding fields (e.g., corresponding 4-bit fields) of a pair of operands (e.g., 64-bit operands) that encode information used in a more complete effective address calculation. Such an index encoding may then itself be decoded using decode logic 220 to select a corresponding word line. Of course, other index codings are also possible. For example, index 210 may be encoded as the two 4-bit fields and decode logic 220 may simply identify the corresponding word line based on the received pair of field inputs, in effect conflating addition and decode in combinatorial logic.

In either case, indexing in the illustrated configuration is speculative in that array access is performed without benefit of carry-in from lower-order bits (e.g., bits 50:63) of an effective address (EA) calculation. Accordingly, tag array 21 supplies a pair of tags ($D_{OUT}$(odd) and $D_{OUT}$(even)) pending resolution of any carry-in contribution 292 of lower-order bits. Selector 295 selects a particular one of the speculatively retrieved tags based on resolution of the speculative condition. Depending on the implementation, a carry-in contribution, a computed effective address value (e.g., EA(51)) or other similar value may be used to resolve the speculation and control selector 295. By speculatively indexing in tag array 21, access can be initiated even before completion of an effective address calculation with its associated carry propagation delays.

Note that although FIG. 2 illustrates a single array, some embodiments consistent with the present invention may implement multiple arrays. Furthermore, some embodiments consistent with the present invention represent multiple tag ways (e.g., 4 tag ways in the 4-way set-associative cache embodiment later described). Accordingly, multiple instances of tag array 21 may be provided (e.g., as additional pitch-matched arrays) or bitcell array 240 may itself encode, and column logic 245 concurrently supply, retrieved tags corresponding to a multiplicity of ways. For generality and clarity of description, only a single way is explicitly illustrated in FIG. 2.

Turning now to FIG. 3, we depict organization of a corresponding information array for a memory or cache configuration consistent with some embodiments of the present invention. In particular, information array 22 includes a bit-cell array 260, decode logic 221, word line drivers 250, control logic 265 and column logic 246. As before, persons of ordinary skill in the art will recognize these features as typical components memory array design and will appreciate a wide range of implementations and circuits consistent therewith. As before, timings for signals such as read enable (READEN2) 290 and clock C1 may be adapted to the particular implementation and circuits employed, but are otherwise conventional.

In general, information array 22 may encode information that is characterizable as address translations, data, instructions, data and instructions, etc. As with the tag array(s), some embodiments consistent with the present invention may implement multiple information arrays. Similarly, some embodiments consistent with the present invention represent multiple ways (e.g., 4 information ways in the 4-way set-associative cache embodiment later described). Accordingly, multiple instances of information array 22 may be provided or bitcell array 260 may itself encode, and column logic 246 concurrently supply, retrieved information corresponding to a multiplicity of ways. As before, for generality and clarity of description, only a single way is explicitly illustrated in FIG. 3.

Like the tag array, information array 22 receives memory access addressing information suitable to select and drive corresponding word lines of its bitcell array 260. However, unlike the tag array, information array 22 uses more complete addressing information 211, typically a fully-resolved effective address that is available later than the speculative index employed in some embodiments to address the corresponding tag array. Note that in TLB embodiments, effective address 211 encodes a virtual address. In the illustrated configuration, decode logic 221 receives effective address 211 information and activates a corresponding circuit of word line drivers 250, which in turn allows addressed information to be read out of bitcell array 260 (as $D_{OUT}$) using column logic 246. In general, widths of bitcell array 260 and column logic 246 will depend on the nature of the information cached. For example, in some TLB embodiments, the width of bitcell array 260 corresponds to address translation width. Similarly, in some L1 data cache embodiments, width of bitcell array 260 is that of a cache line.

Since information read out of bitcell array 260 may or may not correspond to a hit, tags 271 retrieved from tag array 21 (now with speculation, if any, resolved) are compared to corresponding bits of addressing information 211, typically the fully resolved effective address. If a tag matches a corresponding portion of the effective address, then selector 275 is controlled (via line 272) to supply the corresponding information as that corresponding to the effective address (e.g., a physical address association in the case of a TLB embodiment or cache line contents in the case of an L1 cache embodiment). Of course, as before, some embodiments consistent with the present invention are based on a multi-way cache design. Accordingly, in at least some embodiments, a multiplicity of comparators 270 may be employed to compare each retrieved tag way (tags 271) with corresponding bits of addressing information 211 and, upon a match, to provide way selection (via line(s) 272) to control one or more selector(s) 275 and thereby select the appropriate information way.

For a given memory access, corresponding triggering edges of clocks C1 and C2 are phased such that an access in tag array 21 precedes the corresponding access in information array 22. In some embodiments, clocks C1 and C2 may correspond to rising and falling edges of a same or synchronized clock. In some embodiments, an access in tag array 21 is initiated in a cycle that immediately precedes that in which the corresponding access is initiated in information array 22. However, more generally, a timing signal such as that illustrated as clock C1 need only be phased behind a timing signal such as clock C2 and clocks (and indeed accesses in the respective arrays) may be partially overlapped, if desired.

Figure 4:
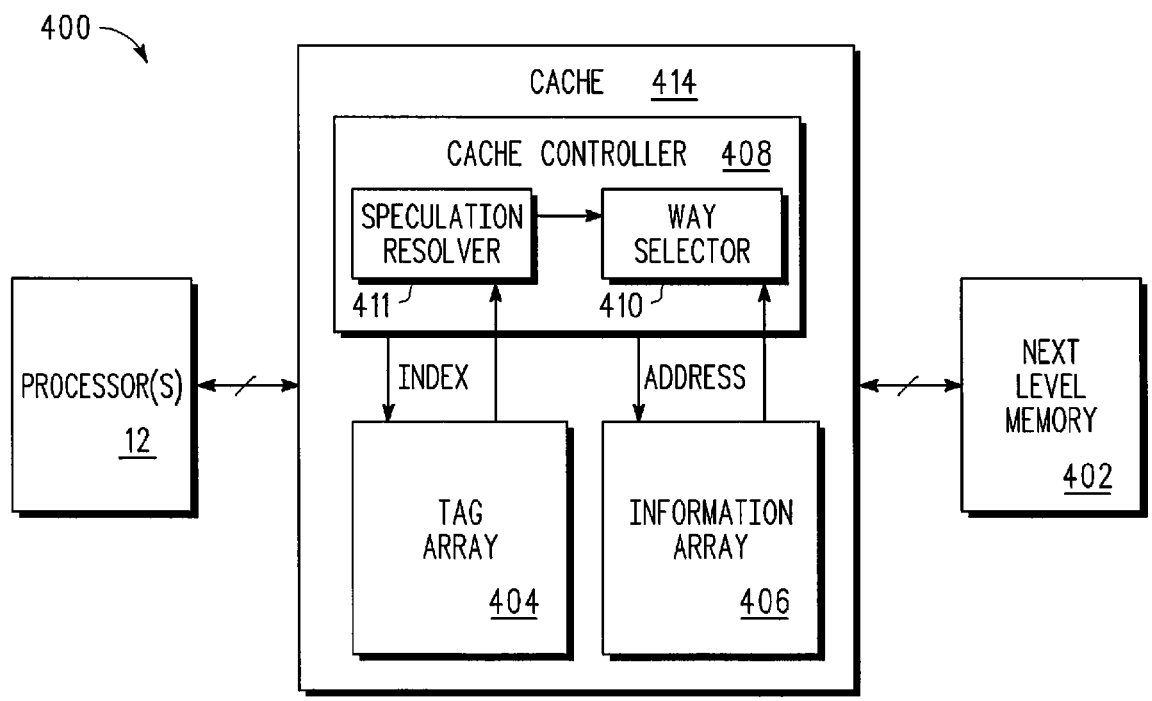
FIG. 4 shows a diagram of an exemplary cache, including split tag and information arrays, consistent with some embodiments of the present invention.

FIG. 4 shows a diagram of an exemplary cache 414, including split tag and information arrays 404 and 406, consistent with some TLB embodiments of the present invention. Although the primary focus of our description is on memory management and address translation embodiments of cache 414, persons of ordinary skill in the art will recognize that cache 414 is also consistent with data and/or instruction cache embodiments of the present invention which may be used along with one or more processor(s) 12 and a next level memory 402. Tag array 404 and information array 406 include a plurality of tag entries and information entries that are indexed and addressed as explained elsewhere herein. In some embodiments, tag array 404 and information array 406 are organized with multiple ways. In general, cache 414 include (or constitute) an address translation buffer, a data cache, an instruction cache or a cache that includes both data and instruction information.

Figure 6:
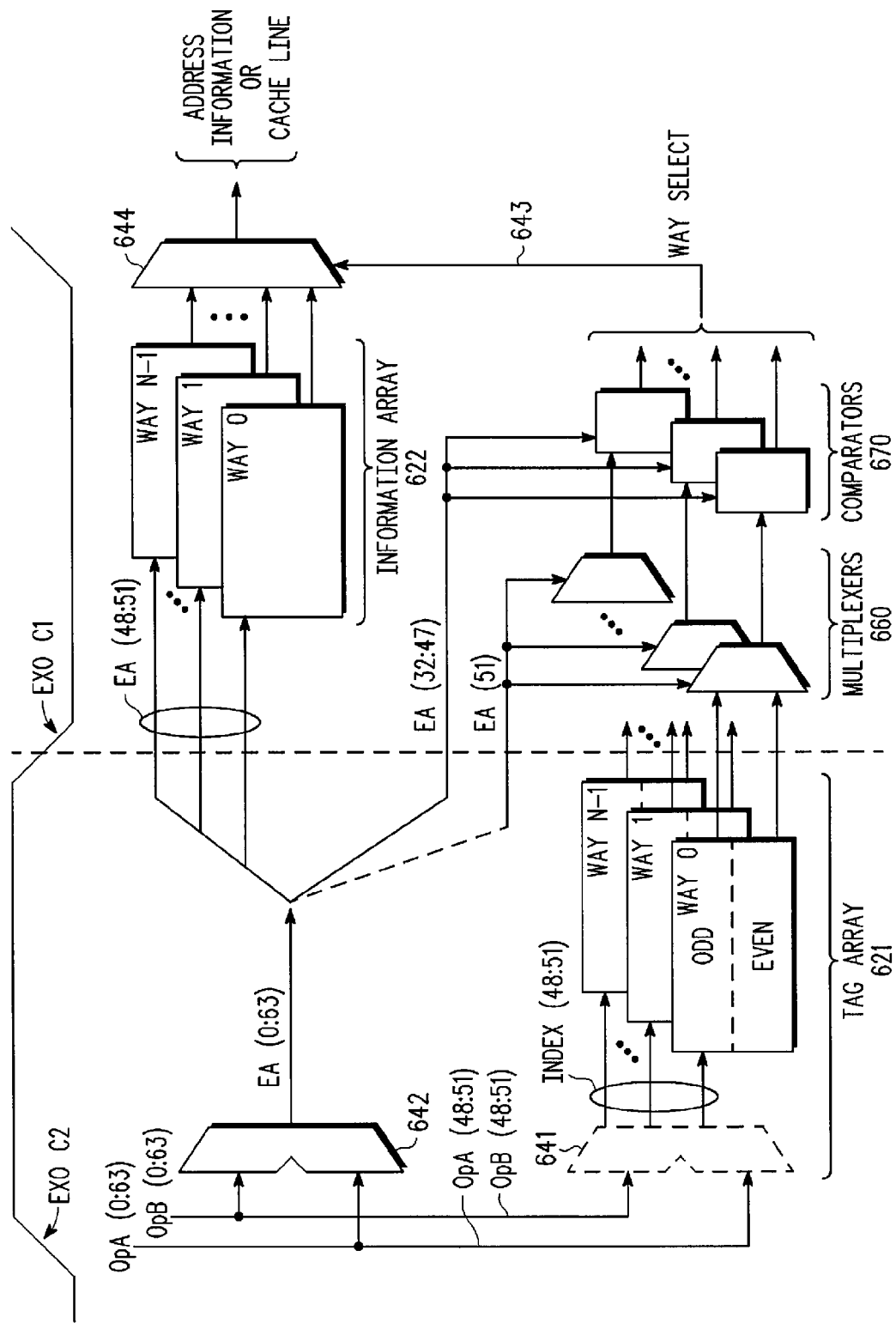
FIG. 6 shows a diagram of an exemplary cache configuration consistent with some embodiments of the present invention.

In the illustration of FIG. 4, a cache controller 408 includes logic circuits that compute index and address information based on a memory access initiated by processor 12 and corresponding operand information. In general, these circuits implement at least partial-address-width adders for indexing/addressing into tag array 404 and information array 406 based on the operand information. In some embodiments, tag array 404 is speculatively indexed and cache controller 408 may include logic that implements speculation resolver 411. As explained elsewhere herein, the use of speculative indices facilitate rapid retrieval from a tag array such as tag array 404 subject to later resolution of the speculative condition. Finally, in some embodiments, cache 414 is organized as a multi-way design, and cache controller 408 may include way selector 410 logic that compares multiple tag ways retrieved from tag array 404 against a calculated address to select the appropriate way (if any) from information array 406. In the illustrated configuration, tags that are appropriate given resolution of the speculation are supplied to way selector 410 logic, although other allocations of functionality and information/signal flows are possible. FIG. 6, which is described below, details one exemplary realization for an N-way set-associative translation lookaside buffer.

Figure 5:
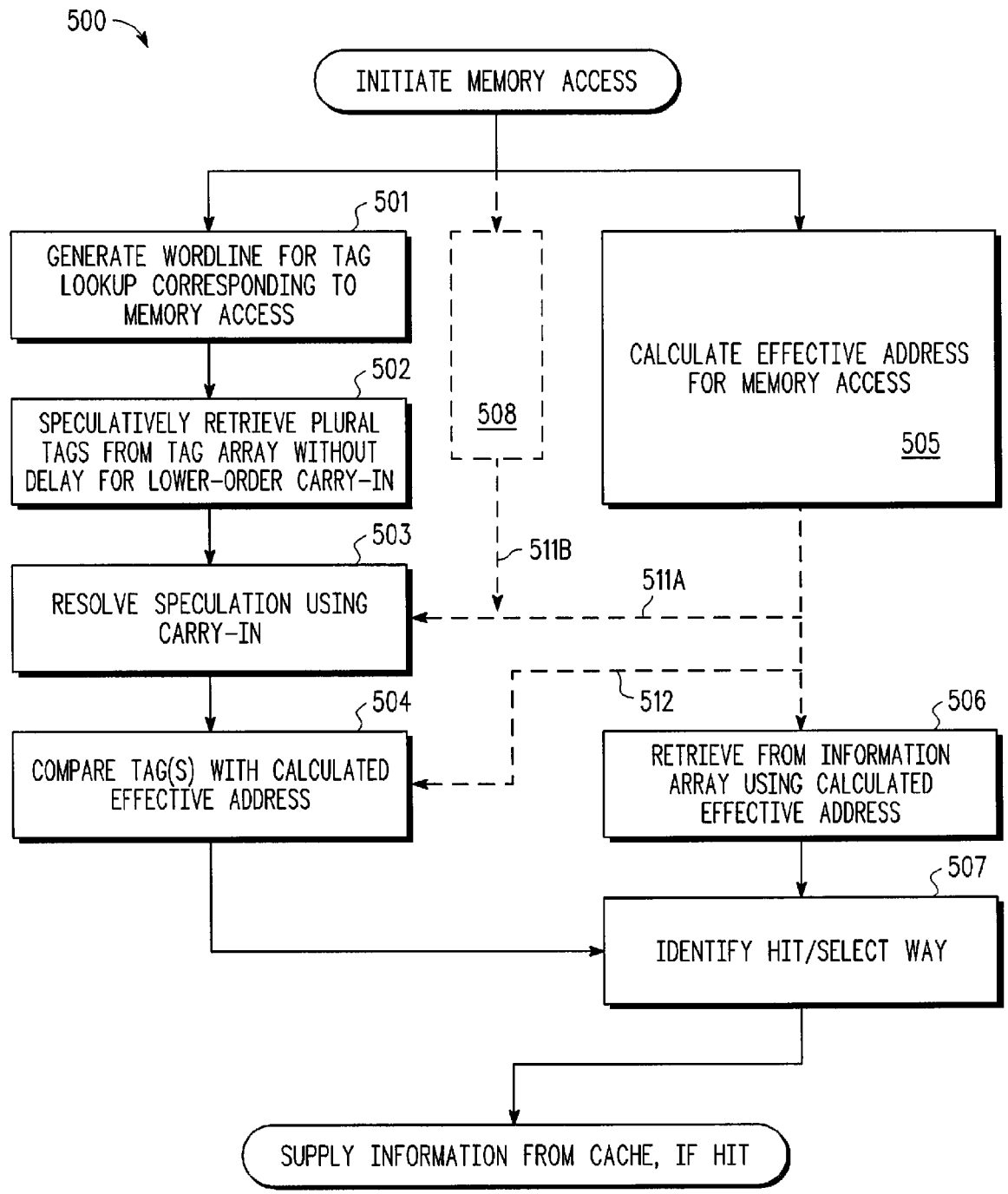
FIG. 5 shows a flowchart for a memory access operation consistent with some embodiments of the present invention.

FIG. 5 shows a flowchart for a memory access operation consistent with some embodiments of the present invention. In furtherance of a given memory access, largely independent accesses to a tag array and an information array are initiated. In particular, we generate (501) a word line for tag lookup and speculatively retrieve (502) tags from the tag array while concurrently calculating (505) an effective address for the memory access. Generally, by speculatively retrieving based on a narrow field-width address computation and ignoring (hence the speculation) carry-in contributions from lower order bits that are more fully treated in the full effective address calculation, we can generate (501) indexing information and at least initiate the retrieval (502) from the tag array before calculation (505) of the effective address is complete.

In general, our speculation can be resolved (503) using later arriving (511A) portions of the effective address, now calculated (505). Alternatively, in some embodiments, speculation may be resolved using outputs (511B) of a separate, narrower-bit-width (and faster) computation (508). Although such embodiments add additional logic, they may allow the speculative aspect of tag indexing to be resolved even before completion of the effective address calculation (505). Accordingly, in such embodiments, tag lookup (including resolution of any speculative retrieval) may be completed even before completion of the effective address calculation (505).

We retrieve the addressed information (506) from the information array using the calculated (505) effective address. Typically, this retrieval is at least partially concurrent with resolution (503) of tag speculation and/or comparison (504) of one or more retrieved tags with the now calculated effective address.

In the illustrated flow, we presume multi-way tag and information arrays. Therefore, even after speculation is resolved, multiple tags are available to be compared (504) against a corresponding portion (512) of the effective address, now calculated (505). Based on a match, the appropriate way is selected (507) and the corresponding information accessed from the information array can be supplied. As before, the precise nature of information supplied from the information array is exploitation dependent. For example, in TLB-type exploitations, a physical address association is typically supplied for the memory access, whereas in an L1 data cache exploitation, contents of the corresponding cache line may be supplied. In embodiments that do not allow a given information unit to be stored in one of several cache entries, way selection need not be performed. Instead, the comparison (504) of a retrieved tag against a corresponding portion (512) of the effective address indicates whether or not the corresponding entry, now retrieved (506) from the information array, is a hit.

FIG. 6 shows a diagram of an exemplary cache configuration consistent with some embodiments of the present invention. Separate tag 621 and information 622 arrays are provided and corresponding accesses in the separate arrays are phased in time and in general correspondence with a pipeline timing legend that illustrates C2 and C1 clock phases of an execution pipeline stage (EX0). Both tag array 621 and information array 622 are accessed using addressing information derived (for a given memory access request) from the 64-bit operands, OpA(0:63) and OpB(0:63), employed in an instruction set architecture that defines operations (including memory access operations) based thereon. In the exemplary cache configuration, a 64-bit effective address EA(0:63) is calculated as the arithmetic sum of operands OpA(0:63) and OpB(0:63). As previously explained, big-endian addressing conventions are arbitrary and, based on the present description, persons of ordinary skill in the art will appreciate transformations for other bit- and/or byte-ordering conventions.

Sixteen-bit tags are stored in entries of tag array 621 to signify that the corresponding entry in information array 622 contains information (e.g., an address translation or a cache line) for which the relevant bits EA(32:47) of an effective address match the tag. The exemplary cache configuration is consistent with an N-way set associative cache design in which both tag array 621 and information array 622 are organized as N-way arrays.

Tag array 621 is speculatively accessed using a 4-bit index derived from corresponding 4-bit portions, OpA(48:51) and OpB(48:51), of the operands used to calculate an effective address for the memory access. In the functional illustration, OpA(48:51) and OpB(48:51) inputs are supplied to an adder circuit (or similar functionality) that computes an arithmetic sum, INDEX(48:51) which is used to index into tag array 621. Alternatively, in some embodiments, OpA(48:51) and OpB(48:51) inputs may be supplied directly to decoder/word line generation circuits which combine (in combinatorial logic) both arithmetic addition and decode selection. Accordingly, index adder 641 is illustrated primarily for clarity of information dependencies and may be omitted as a separable component in some realizations.

Accesses in the illustrated tag array 621 are speculative because INDEX(48:51) is calculated (or word line generation is performed) without benefit of carry-in contributions from lower-order bits (52:63) of the operands used to calculate an effective address for the memory access. Accordingly, both odd and even entries are represented in tag array 621. The odd and even entries represent respective tags that should be accessed in either of two possible situations, namely EA(51)=1 and EA(51)=0, that will be resolved later based on actual carry-in conditions. By speculatively accessing tag array 621, operations (including index calculation/decode, word line generation, bit line precharge, strobe, sense amp readout, column select, etc.) can all be performed without delays associated with full effective address computation or even carry-propagate delays for some lesser computation. In some embodiments, such operations are instead performed concurrently with the operation of effective address adder 642. As previous described, an N-way design is illustrated in FIG. 6. Therefore, odd and even entries for each of N ways are speculatively retrieved from tag array 621 based on 4-bit portions, OpA(48:51) and OpB(48:51), of the operands used to calculate an effective address for the memory access.

Resolution of the prior speculation is performed using a proper calculation of bit 51 of the effective address. Depending on the timing and design goals of a particular implementation, EA(51) may be supplied as an output of effective address adder 642, or may be separately computed using a narrow width adder or similar circuit optimized for gate delays to supply EA(51). In either case, a now resolved EA(51) is used to control multiplexers 660 which, in turn, supply (for each way) the corresponding nonspeculative 16-bit tag for comparison against corresponding bits EA(32:47) of the calculated effective address. Comparators 670 perform the comparisons and a matching tag way (if any) drives way selection 643 on read-out from information array 622.

Although FIG. 6 illustrates a particular configuration in which multi-dimensional speculation (e.g., both way-speculation and odd/even row speculation) is exploited in retrievals from tag array 621, other embodiments may speculate in one dimension but not the other. For example, in some embodiments, power considerations may suggest that only word lines associated with either the odd or even row partitions be energized. In such embodiments, circuitry analogous to multiplexers 660 may be integrated with word-line selection, in effect trading some increase in word-line selection latency for reduced power dissipation in the tag array. In general, these and other design choices are implementation dependent.

Like tag array 621, information array 622 is organized as an N-way array. Using index bits EA(48:51) of an effective address EA(0:63) calculated by effective address adder 642, corresponding entries are accessed for each information way. For example, in an exemplary TLB embodiment, 44-bit address translation entries are accessed for each information way. The information way (if any) for which a corresponding tag match has been identified (using comparators 670) is selected using multiplexer 644. Other portions of the calculated effective address EA(0:63) may, of course, be employed in additional virtual memory/page table computations or used in the selection of a particular memory access target within an accessed cache line. For clarity and breadth of description, neither additional virtual memory computations nor addressing within a cache-line are explicitly shown in FIG. 6, although persons of ordinary skill in the art will appreciate suitable extensions for TLB and data/instruction cache style embodiments.

Figure 7:
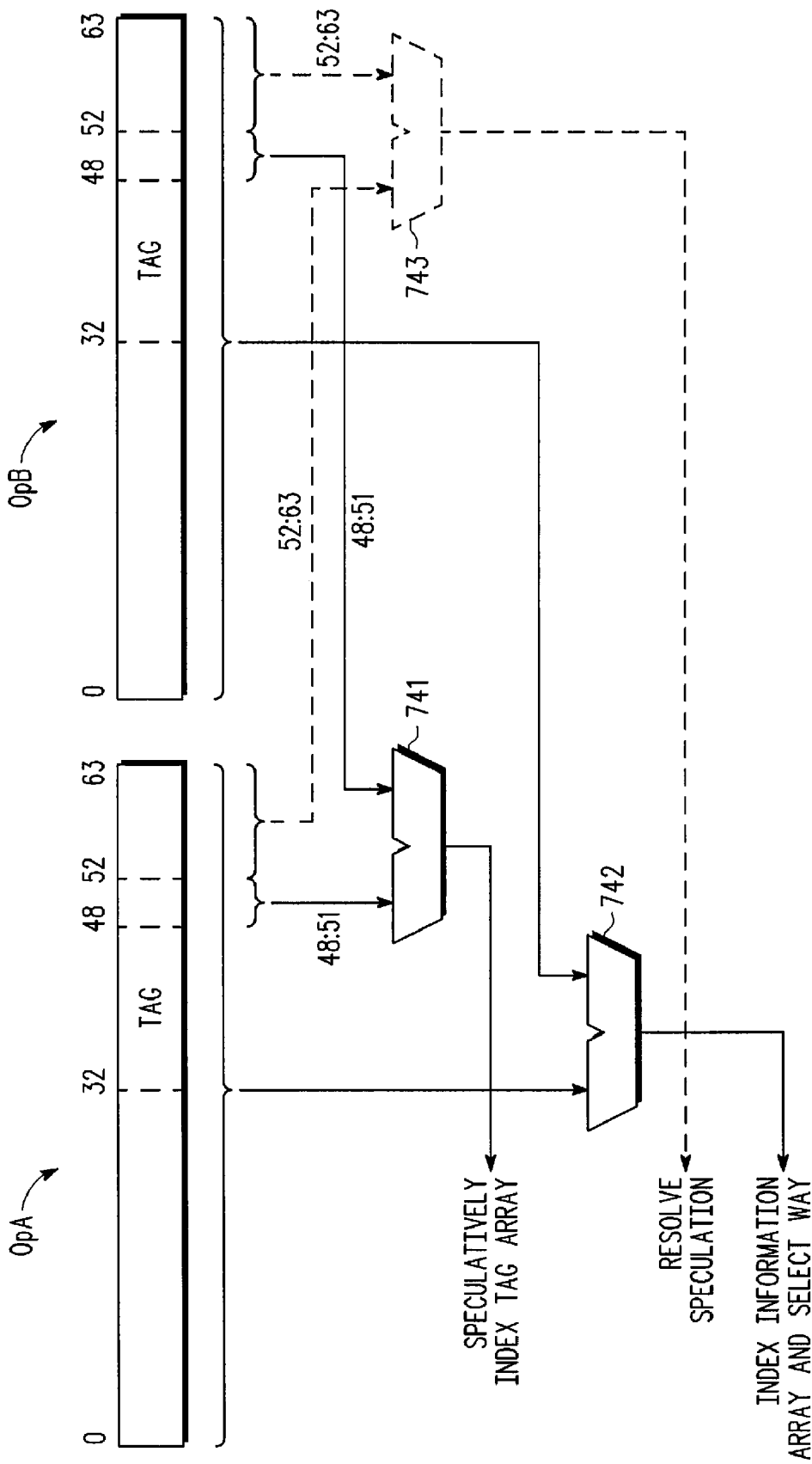
FIG. 7 is an illustration of information flows and index/address computations performed in an exemplary cache configuration consistent with some embodiments of the present invention.

FIG. 7 is an illustration of information flows and index/address computations performed in an exemplary cache configuration consistent with some embodiments of the present invention. Three memory address arithmetic computations are illustrated together with source portions of two operands OpA and OpB, consistent with the example of FIG. 6. Of course, variations for different indices, tags, bit-widths and other implementation-specific details of a particular cache design will be apparent to persons of ordinary skill in the art.

In the illustrated configuration, bits 48:51 of operands OpA and OpB are added (either directly by adder 741 or implicitly by operation of decode/word line generation circuitry) to index into, and speculatively retrieve corresponding tags from, a tag array. Similarly, bits 0:63 of operands OpA and OpB are added (using adder 742) to provide an effective address. Using portions of the effective address, an information array is indexed and corresponding cache line entries are retrieved, tag matches and way selection are performed, further addressing within a cache line is accomplished, and (in some embodiments) virtual memory calculations and transformations are performed. In some embodiments, odd/even tag speculation is resolved using a portion of the effective address. In other embodiments, an additional computation is performed (using adder 743 operating on bits 52:63 of operands OpA and OpB) to resolve odd/even tag speculation.

Other Embodiments

Although the invention is described herein with reference to specific embodiments, various modifications and changes can be made without departing from the scope of the present invention as set forth in the claims below. For example, although multi-way set-associative cache configurations typical of an L1 data cache have been detailed, other specializations (such as for instruction or address translation information) are possible and other associations and mapping techniques (including those characteristic of fully associative or direct mapped caches) may be employed consistent with the present invention. Similarly, other addressing conventions may be employed consistent with the present invention.

Accordingly, the specification and drawings are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims. Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of operating a cache, the method comprising:
encoding tag and information in respective separately addressable arrays of the cache; and
for a given access to the cache, calculating an effective address for information array lookup at least partially in parallel with a corresponding tag lookup in the separately addressable tag array, wherein the calculated effective address is non-speculative.

2. The method of claim 1,
wherein the tag array is partitioned into at least odd and even index portions,
the method further comprising speculatively retrieving entries from both the odd and even index portions of the tag array and selecting therefrom based on a later arriving carry-in indication.

3. The method of claim 1,
wherein the cache is organized as a translation lookaside buffer; and
further comprising retrieving address translations from the information array.

4. The method of claim 1,
wherein both the tag and information arrays are organized as N-way arrays.

5. The method of claim 4, further comprising:
concurrently retrieving plural tags from the tag array, wherein each of the retrieved tags corresponds to a separate way; and
comparing the retrieved tags against a portion of the calculated effective address and, upon a match, supplying an appropriate way select indication for selection from the data array.

6. A method of operating a cache, the method comprising:
encoding tag and information in respective separately addressable arrays of the cache;
for a given access to the cache, calculating an effective address for information array lookup at least partially in parallel with a corresponding tag lookup in the separately addressable tag array; and
speculatively generating, without use of the calculated effective address, plural word lines for the tag lookup.

7. The method of claim 6, wherein the plural word lines are speculatively generated without benefit of a carry-in indication, and further comprising:
speculatively accessing plural entries of the tag array based on the respective speculatively generated word lines; and
selecting from amongst plural speculatively accessed entries of the tag array, based on the carry-in indication.

8. The method of claim 7,
wherein the carry-in indication is calculated separately from the effective address.

9. The method of claim 7,
wherein the carry-in indication is supplied using a portion of the calculated effective address.

10. The method of claim 7,
wherein respective ones of the tag and information array lookups corresponding to a particular memory access are phased in time, the tag lookup being initiated before the corresponding information array lookup.

11. An apparatus comprising:
a cache including separately addressable tag and information arrays thereof;
an effective address adder coupled to receive inputs corresponding to a given memory access operation and to supply the information array with a calculated effective address for selection therein; and
an index generator coupled to receive at least a subset of the inputs corresponding to the given memory access operation and, based thereon, to concurrently supply the tag array with plural corresponding index selections,
wherein lookups in the tag and information arrays are staged in a pipeline configuration such that, for the given memory access operation, the effective address is calculated at least partially in parallel with the corresponding index selections in the tag array.

12. The apparatus of claim 11,
wherein the cache is organized as a translation lookaside buffer; and
wherein the calculated effective address encodes a virtual address.

13. The apparatus of claim 11,
wherein both the tag and information arrays are organized as N-way arrays.

14. The apparatus of claim 13, further comprising:
plural comparators each corresponding to respective one of the N ways and each coupled to compare a portion of the calculated effective address with a tag retrieved from the tag array, the comparators coupled to supply, in correspondence with a match, an appropriate way select indication for selection from the information array.

15. The apparatus of claim 11, further comprising:
a processor; and
a memory,
wherein the cache, the effective address adder and the index generator are configured as part of a memory management unit coupled between the processor and the memory.

16. An apparatus comprising:
a cache including separately addressable tag and information arrays thereof;
an effective address adder coupled to receive inputs corresponding to a given memory access operation and to supply the information array with a calculated effective address for selection therein; and
an index generator coupled to receive at least a subset of the inputs corresponding to the given memory access operation and, based thereon, to concurrently supply the tag array with plural corresponding index selection,
wherein the index selections in the tag array are speculatively generated, without use of the calculated effective address.

17. The apparatus of claim 16, comprising:
wherein the calculated effective address is non-speculative.

18. An apparatus comprising:
a cache including separately addressable tag and information arrays thereof;
an effective address adder coupled to receive inputs corresponding to a given memory access operation and to supply the information array with a calculated effective address for selection therein;
an index generator coupled to receive at least a subset of the inputs corresponding to the given memory access operation and, based thereon, to concurrently supply the tag array with plural corresponding index selection, wherein the plural indices are speculatively generated without benefit of a carry-in indication; and
selection logic selective, based on the carry-in indication, from amongst plural speculatively accessed entries of the tag array.

19. The apparatus of claim 18, further comprising:
logic separate from the effective address adder but coupled to receive at least a subset of the inputs corresponding to the given memory access operation and to calculate based thereon the carry-in indication.

20. The apparatus of claim 18,
wherein the selection logic is coupled to receive the carry-in indication from the effective address adder.

21. An apparatus comprising:
a cache including separately addressable tag and information arrays thereof;
an effective address adder coupled to receive inputs corresponding to a given memory access operation and to supply the information array with a calculated effective address for selection therein;
an index generator coupled to receive at least a subset of the inputs corresponding to the given memory access operation and, based thereon, to concurrently supply the tag array with plural corresponding index selection, wherein the tag array is partitioned into plural subportions from which entries are speculatively retrieved based on the plural word line selections; and
selection logic selective for particular ones of the retrieved entries based on later arriving information.

22. The apparatus of claim 21,
wherein the index generator includes a word line generator coupled to receive higher-order bits of the inputs corresponding to the memory access operation;
wherein the plural subportions are odd and even, row-oriented subportions of the tag array; and
wherein the later arriving information includes carry-in information from addition of lower-order bits of the inputs corresponding to the memory access operation.

23. An apparatus comprising:
separately addressable tag and information arrays of a cache, the tag and information arrays staged in a pipeline configuration;
means for speculatively retrieving from the tag array tag information corresponding to a memory access; and
means for non-speculatively calculating an effective address for lookup in the information array, the effective address corresponding to the memory access and calculation thereof being at least partially in parallel with retrieval of corresponding tag information from the tag array.

* * * * *